US010929061B2

(12) United States Patent
Watanabe et al.

(10) Patent No.: US 10,929,061 B2
(45) Date of Patent: Feb. 23, 2021

(54) MEMORY SYSTEM AND MEMORY CONTROL METHOD

(71) Applicants: TOSHIBA INFORMATION SYSTEMS (JAPAN) CORPORATION, Kanagawa (JP); TOSHIBA MEMORY CORPORATION, Tokyo (JP)

(72) Inventors: Kouji Watanabe, Tokyo (JP); Kiyotaka Iwasaki, Kanagawa (JP)

(73) Assignees: TOSHIBA INFORMATION SYSTEMS (JAPAN) CORPORATION, Kanagawa (JP); TOSHIBA MEMORY CORPORATION, Tokyo (JP)

( * ) Notice: Subject to any disclaimer, the term of this patent is extended or adjusted under 35 U.S.C. 154(b) by 48 days.

(21) Appl. No.: 16/128,228

(22) Filed: Sep. 11, 2018

(65) Prior Publication Data
US 2019/0278517 A1   Sep. 12, 2019

(30) Foreign Application Priority Data

Mar. 12, 2018   (JP) .................................. 2018-044283

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| 8,400,842 | B2 | 3/2013 | Kito et al. |
| 8,984,375 | B2 | 3/2015 | Hashimoto |
| 9,230,665 | B2 | 1/2016 | Hosono |
| 9,443,866 | B1 | 9/2016 | Sakakibara |
| 2013/0080716 | A1 | 3/2013 | Tamura |
| 2015/0127922 | A1* | 5/2015 | Camp ................. G06F 12/0246 711/206 |
| 2016/0266846 | A1* | 9/2016 | Horiguchi ............. G06F 3/0656 |
| 2018/0032281 | A1* | 2/2018 | Gulati ................... G06F 3/0656 |
| 2018/0239557 | A1* | 8/2018 | Yang ....................... G06F 3/061 |
| 2019/0042356 | A1* | 2/2019 | Chen ................... G06F 11/1012 |
| 2019/0190541 | A1* | 6/2019 | Tao .................... H03M 13/3746 |
| 2019/0243704 | A1* | 8/2019 | Muchherla ............ G06F 3/0619 |

FOREIGN PATENT DOCUMENTS

| JP | 2010-266962 A | 11/2010 |
| JP | 2012-069224 A | 4/2012 |
| JP | 2013-069183 A | 4/2013 |
| JP | 5378255 B2 | 12/2013 |
| JP | 5740296 B2 | 6/2015 |

* cited by examiner

*Primary Examiner* — Daniel D Tsui
(74) *Attorney, Agent, or Firm* — Kim & Stewart LLP (57) ABSTRACT

According to one embodiment, a memory system is configured to include a nonvolatile memory and a controller circuit. The controller circuit is electrically connected to the nonvolatile memory. The controller circuit executes a first process and a second process. The first process manages a history of accesses to first storage areas of the nonvolatile memory. The second process manages a progress of accesses to all storage areas of the first storage areas within a first time limit, based on the history of the accesses.

20 Claims, 8 Drawing Sheets

Access history management table (2chips*3blocks)

| Logical block ID | Read history | Erase history |
|---|---|---|
| #0(chip#0,block#0) | 0 | 0 |
| #1(chip#0,block#1) | 0 | 0 |
| #2(chip#0,block#2) | 0 | 0 |
| #3(chip#1,block#0) | 0 | 0 |
| #4(chip#1,block#1) | 0 | 0 |
| #5(chip#1,block#2) | 0 | 0 |

FIG. 3

| Logical block ID | Read history | Erase history |
|---|---|---|
| #0(chip#0,block#0) | 0->1 | 0 |
| #1(chip#0,block#1) | 0 | 0 |
| #2(chip#0,block#2) | 0->1 | 0 |

FIG. 4

| Logical block ID | Read history | Erase history |
|---|---|---|
| #0(chip#0,block#0) | 0 | 0 |
| #1(chip#0,block#1) | 0 | 0 |
| #2(chip#0,block#2) | 0 | 0->1 |

Number of chips=2 , Number of blocks=3

| Count | Logical block ID | Physical address | |
|---|---|---|---|
| | Logical block | Chip number Quotient of count/ number of blocks | Block number Reminder of count/ number of blocks |
| 0 | 0 | 0 | 0 |
| 1 | 1 | 0 | 1 |
| 2 | 2 | 0 | 2 |
| 3 | 3 | 1 | 0 |
| 4 | 4 | 1 | 1 |
| 5 | 5 | 1 | 2 |

MEMORY SYSTEM AND MEMORY CONTROL METHOD

CROSS-REFERENCE TO RELATED APPLICATIONS

This application is based upon and claims the benefit of priority from the Japanese Patent Application No. 2018-044283, filed Mar. 12, 2018, the entire contents of which are incorporated herein by reference.

FIELD

Embodiments described herein relate generally to a memory system and a memory control method.

BACKGROUND

A memory system with a large capacity that uses a three-dimensional NAND-type flash memory, represented by a solid state drive (hereinafter, referred to as SSD), is recently getting attention.

This NAND-type flash memory requires a read operation to prevent a memory cell from losing data over time because of data retention. Thus, a memory system that enables such a read operation to be executed with speed and efficiency is required.

DETAILED DESCRIPTION

According to one embodiment, a memory system is configured to include a nonvolatile memory and a controller circuit. The controller circuit is electrically connected to the nonvolatile memory. The controller circuit executes a first process and a second process. The first process manages a history of accesses to first storage areas of the nonvolatile memory. The second process manages a progress of accesses to all storage areas of the first storage areas within a first time limit, based on the history of the accesses.

Various embodiments will be described hereinafter with reference to the accompanying drawings.

[Configuration of Control System]

Figure 1:
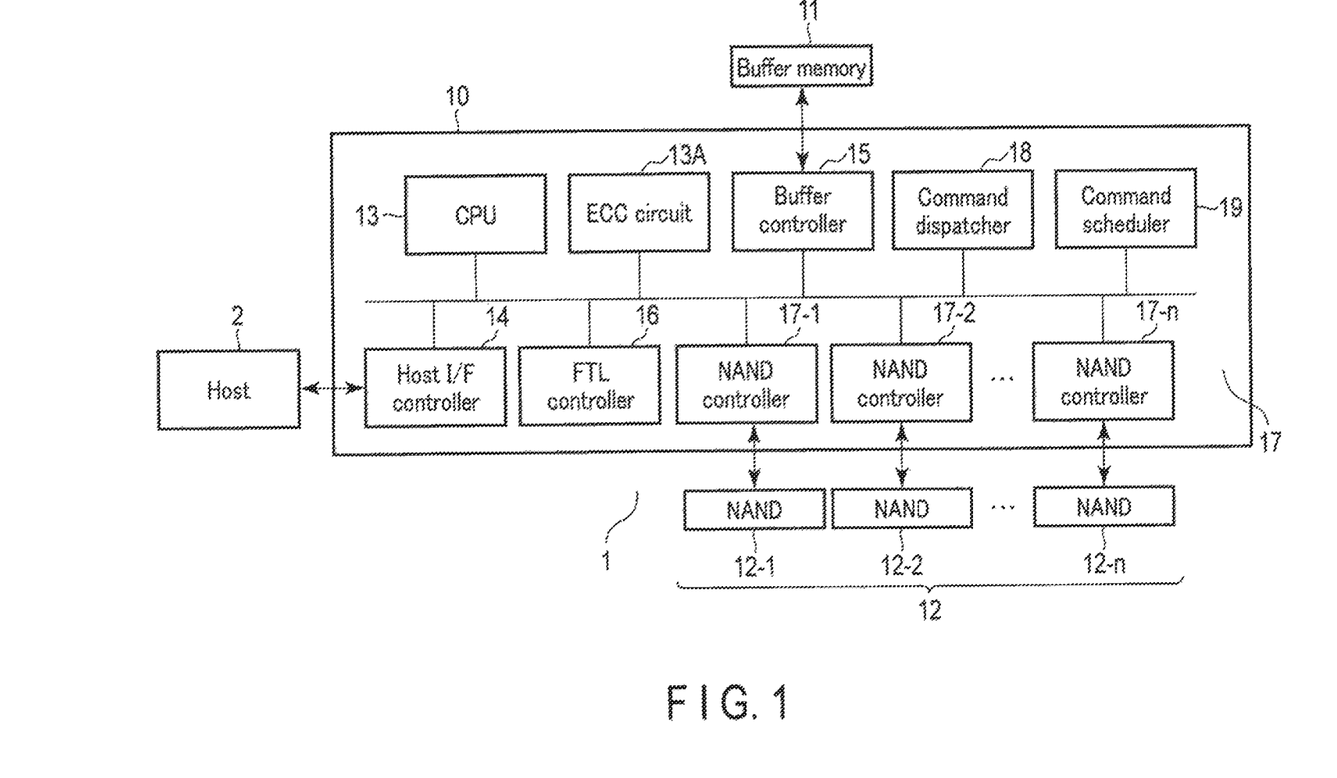
FIG. 1 is a block diagram illustrating the configuration of a memory system according to an embodiment.

FIG. 1 is a block diagram illustrating the configuration of a solid state drive (SSD) 1 as a memory system of the present embodiment. As shown in FIG. 1, the SSD 1 stores data transferred from a host 2 such as a computer, in a NAND-type flash memory 12 (12-1 to 12-$n$), and transfers data read from the NAND-type flash memory 12 (12-1 to 12-$n$) to the host 2.

The SSD 1 includes an SSD controller 10, a buffer memory 11, and the NAND-type flash memory 12. The buffer memory 11 temporarily stores data such as data to be written into the NAND-type flash memory 12 and data read from the NAND-type flash memory 12. Examples of the buffer memory 11 include a volatile memory such as a dynamic random access memory (DRAM), a static random access memory (SRAM), and a magnetoresistive random access memory (MRAM).

The NAND-type flash memory 12 is a nonvolatile memory, and includes a plurality of memory chips 12-1 to 12-$n$. Each of the memory chips 12-1 to 12-$n$ includes a plurality of physical blocks. Each physical block is a minimum unit in which data is independently erasable within the NAND-type flash memory 12. As described later, in the present embodiment, a logical block ID is applied as a serial number for a memory chip and a logical block.

The SSD controller 10 is, for example, a circuit configured as a system on a chip (SoC), and includes a processor (CPU) 13, a host interface (I/F) controller 14, a buffer controller 15, a flash translation layer (FTL) controller 16, a NAND controller 17, a command dispatcher 18, and a command scheduler 19.

The processor 13 may be a main controller which controls the buffer controller 15 and the NAND controller 17, and also, as described later, a background read process (hereinafter, occasionally referred to as a "BG read process") according to the present embodiment. In addition, the processor 13 executes various processes such as a patrol process, a refresh process, and a compaction process. The compaction process corresponds to a garbage collection process.

The BG read process according to the present embodiment only requires that voltage be applied to a memory cell and does not require for the SSD controller 10 to read data out from the NAND-type flash memory 12 unlike other forms of access such as a host access, access for a patrol process, access for a refresh process, and access for a compaction process. Accordingly, the time required for the read process can be shortened by setting a specific read command for the BG read process. The BG read process thus can be executed at high speed. As a result, the possibility of deteriorating a latency to a host access can be reduced.

The host interface controller 14 controls transfer of data, commands, and addresses between the SSD 1 and the host 2. The host interface controller 14 supports communication interfaces such as a Serial Advanced Technology Attachment (SATA), a Serial Attached SCSI (SAS), and a PCI Express (PCIe) (registered trademark). The buffer controller 15 controls an operation of the buffer memory 11 under the control of the processor 13. The FTL controller 16 executes, for example, conversion of a logical address designated by the host into a physical address of the NAND-type flash memory 12.

The NAND controller 17 includes a plurality of NAND controllers 17-1 to 17-*n*, corresponding to the plurality of memory chips 12-1 to 12-*n*, of the NAND-type flash memory 12. The NAND controller 17 is operable to simultaneously read data out from or write data into the memory chips 12-1 to 12-*n* in parallel. Other than the read process and the write process in response to commands from the host 2, the NAND controller 17 executes data read via the aforementioned BG read process based on control by the processor 13. The NAND controller 17 executes, independently of a command from the host 2, the data read process and write process involved in the patrol process, the refresh process, or the compaction process described above.

The command dispatcher 18 is a circuit that dispatches the NAND controller 17 with various commands. The command scheduler 19 is a circuit that schedules commands to be executed by the NAND controller 17, including a command for the BG read process according to the present embodiment.

The SSD controller 10 includes an ECC circuit 13A. Under control of the processor 13, the ECC circuit 13A executes error check and error correction to data read from the NAND-type flash memory 12 by the NAND-controller 17. According to the present embodiment, and as described later, the ECC circuit 13A functions when processes other than the BG read process (for example, the patrol process) are executed.

[Configurations of Command Scheduler and Peripheral Circuits]

Figure 2:
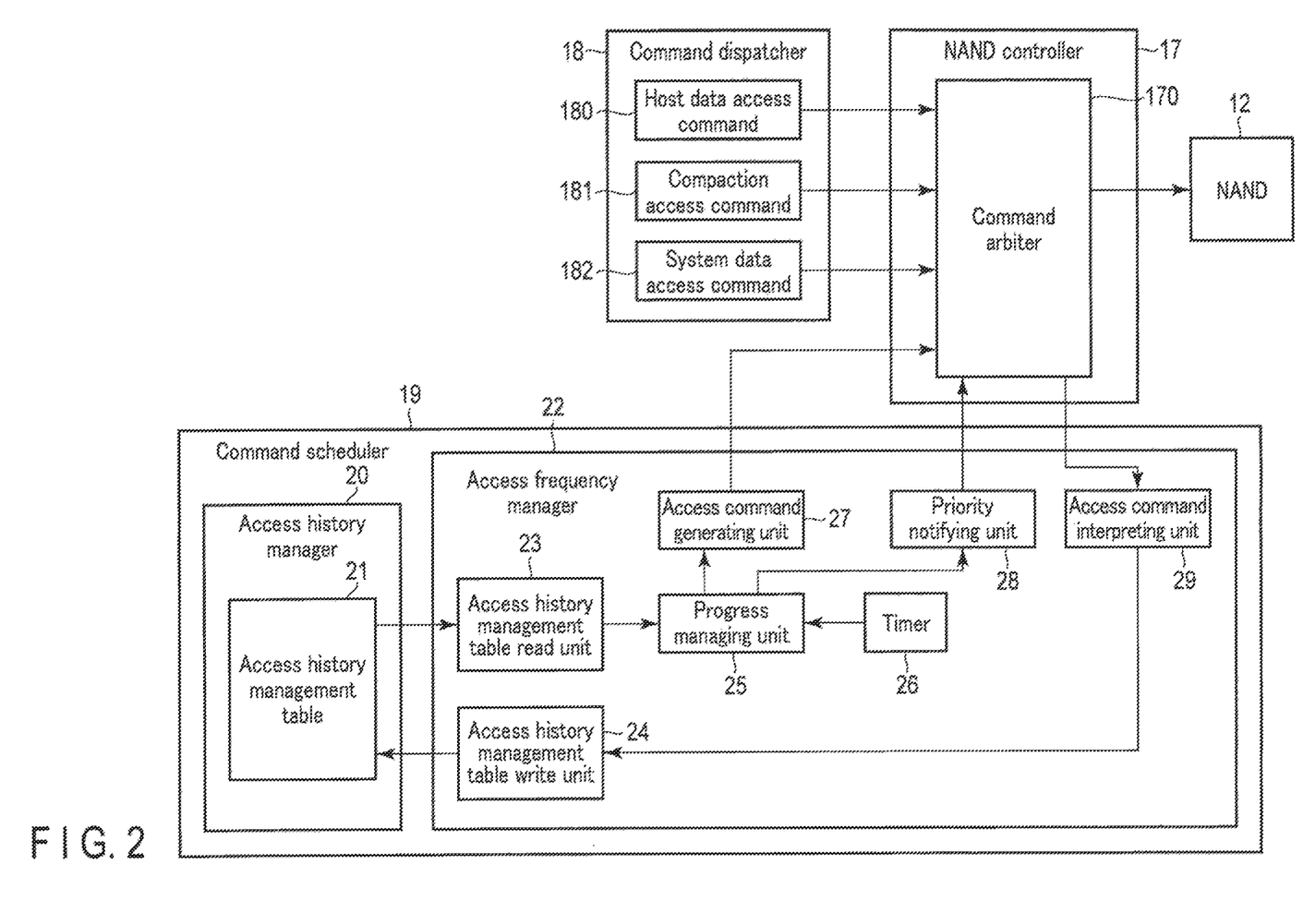
FIG. 2 is a block diagram illustrating the configurations of a command scheduler and peripheral circuits according to the embodiment.

FIG. 2 is a block diagram illustrating the configurations of the command scheduler 19 and the peripheral circuits. The peripheral circuits include the NAND controller 17 and the command dispatcher 18.

As shown in FIG. 2, the NAND controller 17 includes a command arbiter 170, executes a command dispatched by the command dispatcher 18, and controls the data read process and write (program) process with respect to the NAND-type flash memory 12.

The command dispatcher 18 dispatches commands 180, 181, and 182 to the NAND controller 17. The command 180 instructs host data access based on a command from the host 2. The command 181 instructs compaction access. The command 182 instructs system data access. Herein, the command 182 instructs access to system data as information such as a logical/physical address conversion. Both compaction access and system data access are performed to rearrange the location of data in the NAND-type flash memory 12. The commands 181 and 182 are generated spontaneously by the SSD 1, independently of a command from the host 2.

The command scheduler 19 includes an access history manager 20 and an access frequency manager 22. The access history manager 20 saves and manages an access history management table 21, which is to be described later. The access frequency manager 22 includes an access history management table read unit 23 (hereinafter also referred to as a read unit 23), an access history management table write unit 24 (hereinafter also referred to as a write unit 24), a progress managing unit 25, a timer 26, an access command generating unit 27, a priority notifying unit 28, and an access command interpreting unit 29.

The read unit 23 reads information from the access history management table 21 which has been saved by the access history manager 20. The write unit 24 writes (updates) information in the access history management table 21. The write unit 24 generates write data using an access command interpretation result from the access command interpreting unit 29.

The progress managing unit 25 manages a state of progress for access for reading data (BG read process) within a predetermined time limit from all storage areas (other than those not storing data) of the NAND-type flash memory 12 according to the present embodiment, as will be described later. The progress managing unit 25 manages a progress state of access and an elapse of the time for the BG read process, based on information read from the access history management table 21 and time information from the timer 26.

The access command generating unit 27 generates an access command involving the BG read process based on a progress result from the progress managing unit 25. The access command generating unit 27 determines information of an access destination such as a logical block ID.

The priority notifying unit 28 notifies the command arbiter 170 of a priority (for example, the highest priority) of an access command involving the BG read process, based on a progress result obtained by the progress managing unit 25. The command arbiter 170 performs command arbitration by treating the access command involving the BG read process as, for example, a command with the highest priority, based on a priority notified from the priority notifying unit 28. Herein, the priority from the priority notifying unit 28 is cleared when the access command involving the BG read process is executed or completed.

The access command interpreting unit 29 interprets a command arbitrated by the command arbiter 170. The access command interpreting unit 29 acquires information of a read process, a program process and an erase process which are executed along with access to the NAND-type flash memory 12, based on the interpretation of the command.

[Operation of SSD Controller]

The present embodiment relates to control of the BG read process to prevent a memory cell of the NAND-type flash memory 12 from losing data over time due to deterioration in data retention, etc. For example, in a three-dimensional NAND-type flash memory, if read from a word line WL of one physical block, which corresponds to a row selection line for selecting a memory cell, is not executed for several minutes, the memory cell connected to the word line may lose data. In this case, deterioration in data retention can be prevented by reading data from the memory cell within a certain time. Thus, the SSD 1 is required to execute the BG read process for the improved data retention.

According to the present embodiment, the BG read process, in which data is read from all storage areas (other than those not storing data) of the NAND-type flash memory 12, is completed within a time limit (for example, a period of several minutes). In the SSD 1, since access to read designated data from the host 2 has a high execution priority, the execution priority is required to be adjusted between this particular access and access involving the BG read process. According to the present embodiment, thus, the command scheduler 19 changes an execution priority of each access so that the BG read process is completed within the time limit without excessively deteriorating the host access latency.

Figure 3:
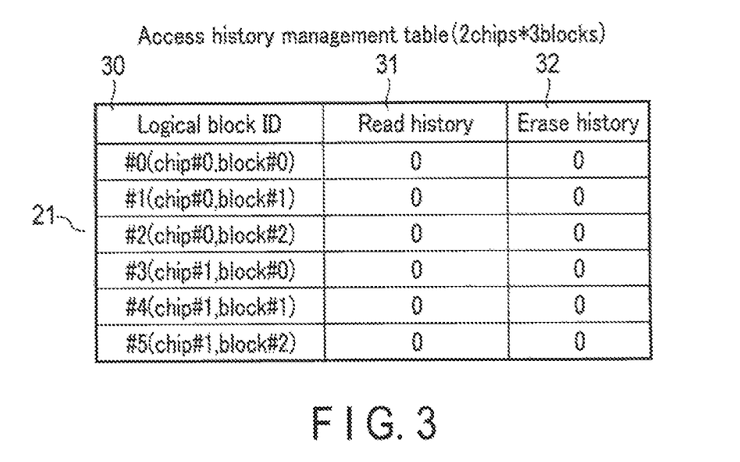
FIG. 3 is a view illustrating an example of an access history management table according to the embodiment.
Figure 4:
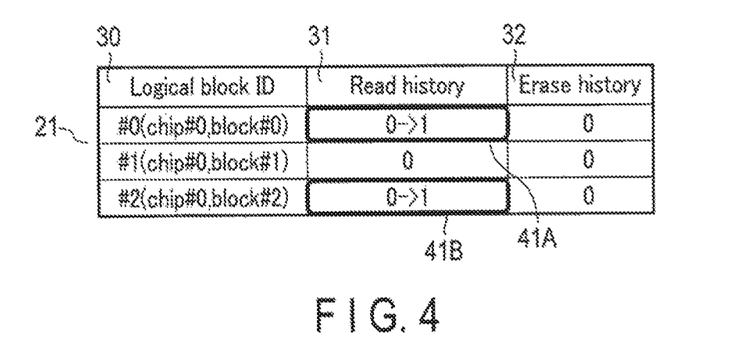
FIG. 4 is a view illustrating an update of a read history of the access history management table according to the embodiment.
Figure 5:
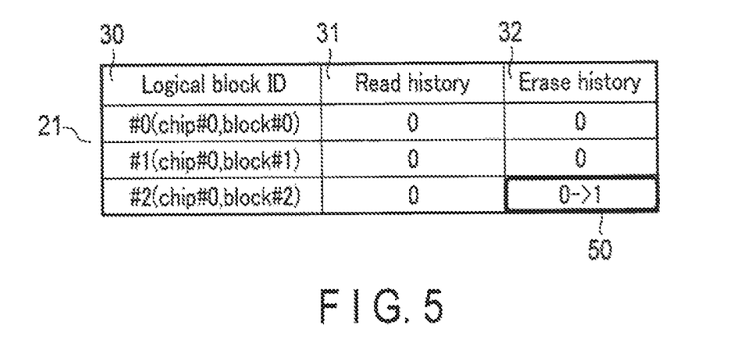
FIG. 5 is a view illustrating an update of an erase history of the access history management table according to the embodiment.
Figure 6:
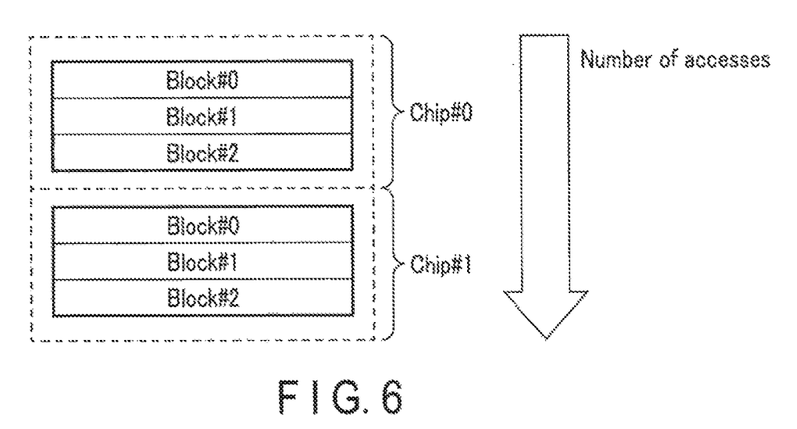
FIG. 6 is a view illustrating an access method in executing a background read process according to the embodiment.
Figure 7:
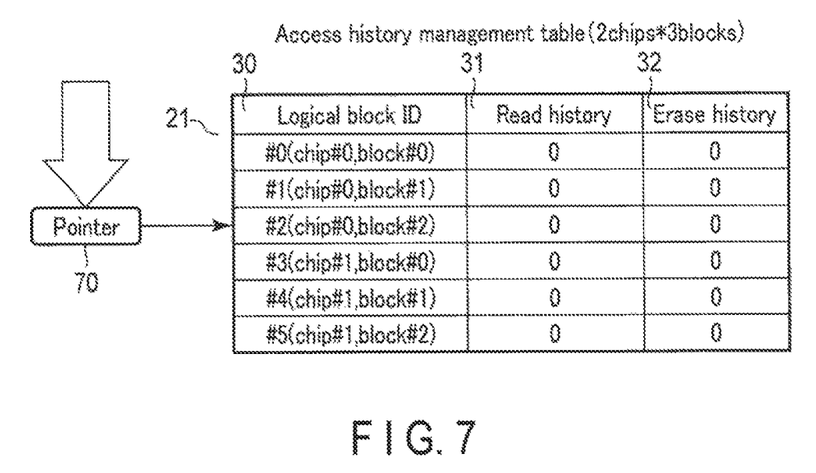
FIG. 7 is a view illustrating access frequency management according to the embodiment.
Figure 8:
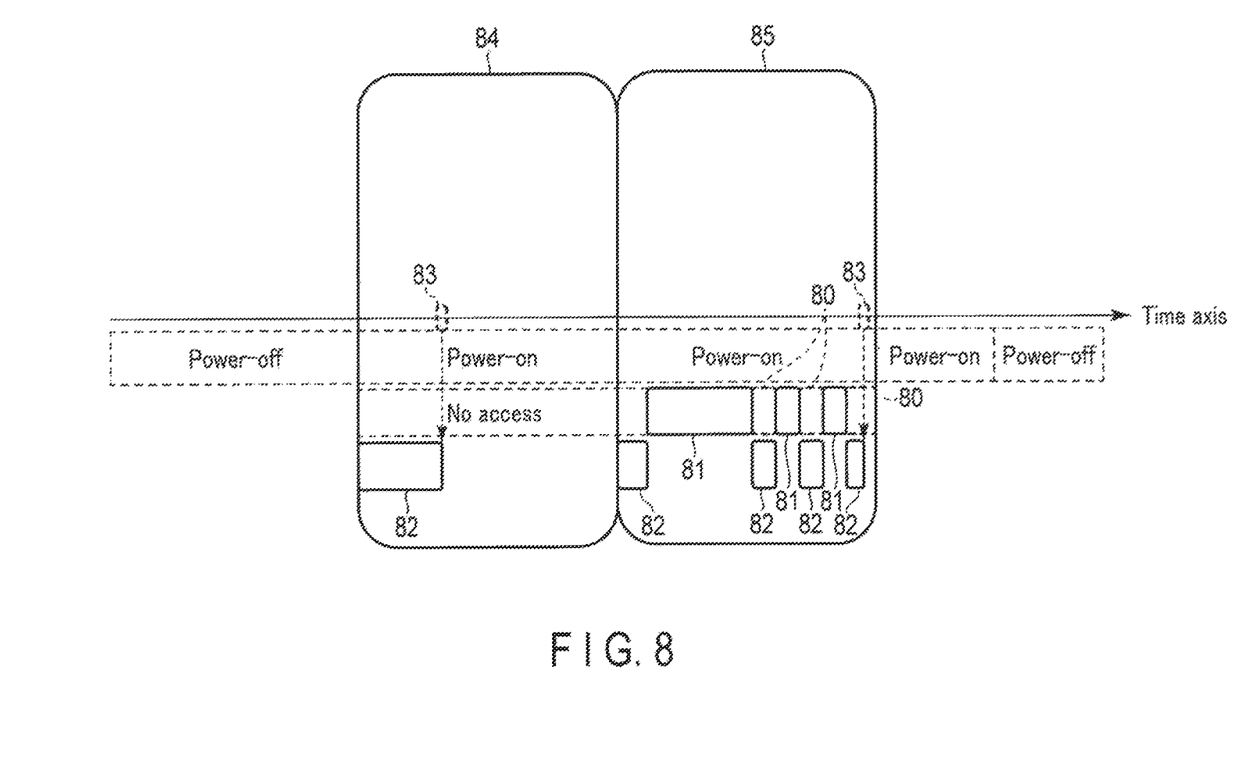
FIG. 8 is a view illustrating an operation status of accesses according to the embodiment.
Figure 9:
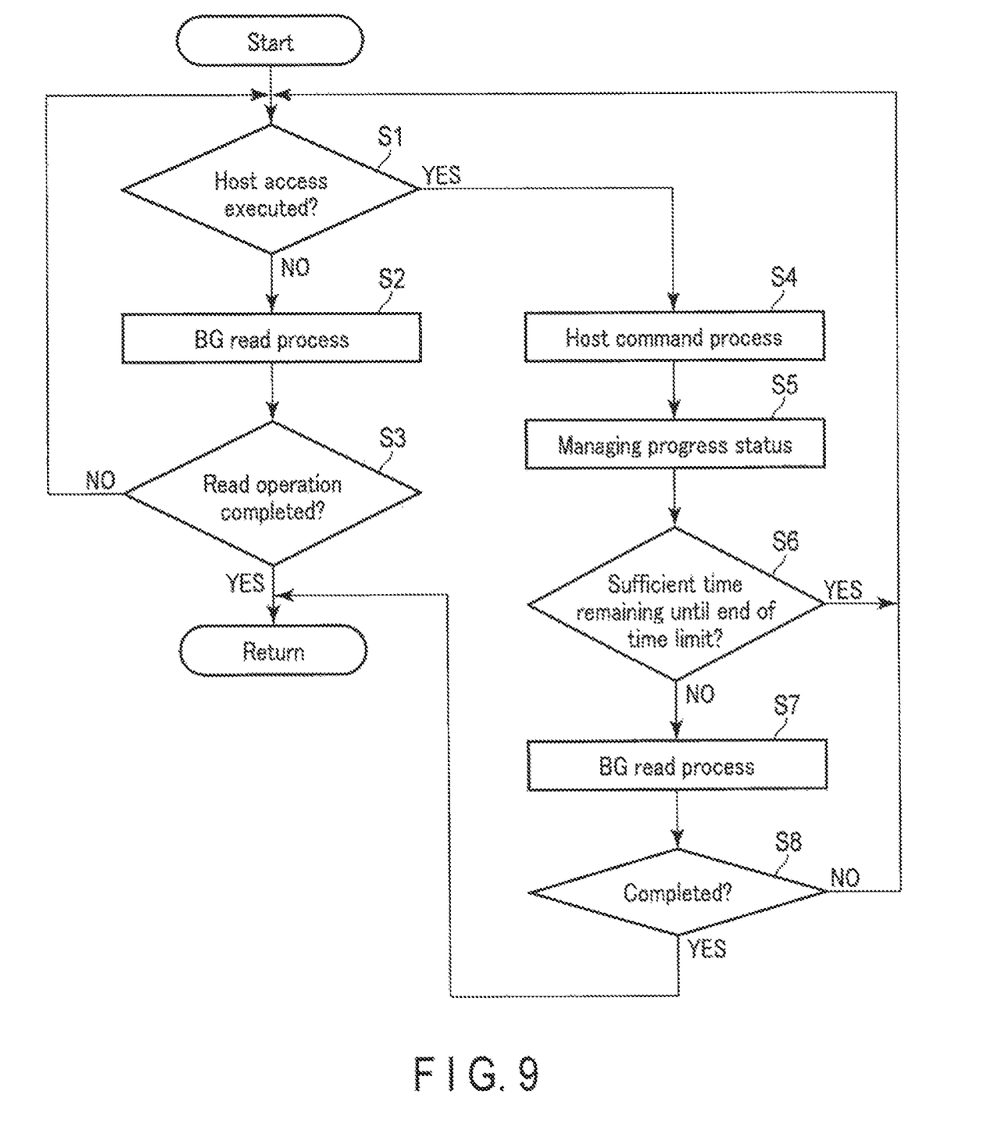
FIG. 9 is a flowchart illustrating an operation of an SSD controller according to the embodiment.
Figure 10:
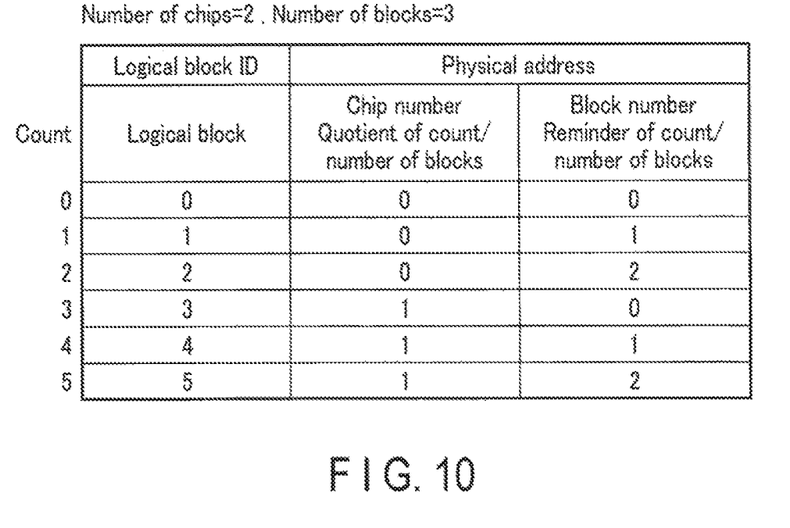
FIG. 10 is a view illustrating a calculation method for a physical address according to the embodiment.

Hereinafter, the operation of the SSD controller 10 will be described with reference to FIGS. 3 to 10. FIG. 3 is a view illustrating an example of the access history management table 21. FIG. 4 is a view illustrating an update of a read history 31 of the access history management table 21. FIG. 5 is a view illustrating an update of an erase history 32 of the access history management table 21. FIG. 6 is a view illustrating an access method in executing the BG read process. FIG. 7 is a view illustrating access frequency management. FIG. 8 is a view illustrating an operation status of accesses. FIG. 9 is a flowchart illustrating an operation of the SSD controller 10. FIG. 10 is a view illustrating a calculation method for a physical address.

As shown in FIG. 3, the access history management table 21 includes fields of the logical block ID 30, the read history 31, and the erase history 32. In the present embodiment, physical addresses of an access-target range of the BG read process to the NAND-type flash memory 12 include, for example, two chips (chip #0, chip #1) and three physical blocks (block #0-block #2). The fields of the logical block ID 30 include logical block IDs, ranging from #0 to #5, corresponding to physical addresses of two chips and three blocks, which specify each storage area.

The fields of the read history 31 include flag information (0/1) indicative of whether a read operation is executed within a time limit to each storage area specified by the logical block ID. That is, if the read operation is executed, flag information (1) is set to the read history 31. On the other hand, the fields of the erase history 32 include flag information (0/1) indicative of whether data is erased from each storage area specified by the logical block ID. Herein, after the power is turned on, information before the power-off (for example, flag information (1) indicative of data being erased) is restored.

In the case where the access history management table 21 contains the flag information (0) in both the read history 31 and the erase history 32, the command scheduler 19 sets the storage area of the corresponding logical block ID as a target for the BG read process. Specifically, the access command generating unit 27 generates an access command (including a logical block ID of an access destination) involving the BG read process, and outputs this access command to the NAND controller 17.

Now, a process procedure of the SSD controller 10 will be described with reference to the flowchart in FIG. 9.

As shown in FIG. 9, in the present embodiment, the SSD controller 10 executes the BG read process (S2) when not executing host access in accordance with a command from the host 2 (NO in S1). Note that, the SSD controller 10 may execute the patrol process, the refresh process, or the compaction process, as access unrelated to the host access. Hereinafter, only the BG read process will be described as the access unrelated to the host access, and descriptions about the patrol process, the refresh process, and the compaction process are omitted.

The NAND controller 17 determines a physical chip of the NAND-type flash memory 12 to which access is actually made, from input information (access-target range information) given by the CPU 13, and reads data from this chip as the BG read process. In the present embodiment, based on the configuration of the NAND-type flash memory 12, the access-target range information corresponds to, for example, two chips (chip #0, chip #1) each including three blocks (block #0-block #2).

As shown in FIG. 6, the NAND controller 17 sequentially reads data from a physical address of chip #0/block #0 corresponding to a leading logical block ID (#0), and executes the BG read process (see FIG. 3). At this time, the NAND controller 17 obtains a physical address of two chips/three blocks as an access target, based on the number of accesses. Hereinafter, how to obtain this physical address will be described with reference to FIG. 10. As shown in FIG. 10, a count value of zero to five, which corresponds to the number of accesses, indicates a logical block ID. In order to determine a physical address from this count value, the calculation of "count value/number of blocks" is executed, and a quotient of this calculation corresponds to a chip number (chip #0/chip #1). Furthermore, a reminder of this calculation corresponds to a block ID (block #0-block #2). If a count value takes a value greater than "the number of chips×the number of blocks", a counter is reset to its initial state (0).

As described above, the NAND controller 17 executes the BG read process in accordance with an access command (including a logical block ID of an access target) which is output from the access command generating unit 27 included in the command scheduler 19. The command scheduler 19 refers to the access history management table 21 using the read unit 23 to read a history of the corresponding logical block ID.

According to the progress managing unit 25, the command scheduler 19 outputs an access command for execution of the BG read process to the NAND controller 17 if the flag information (0) is set to both the read history 31 and the erase history 32 of the corresponding logical block ID (for example, #0). Accordingly, the NAND controller 17 executes this access command, and executes a read operation for the storage area of the logical block ID (#0).

On the other hand, if the flag information (1) is set to the read history 31 of the corresponding logical block ID (for example, #0), the command scheduler 19 skips the BG read process because the read operation has already been executed. Thus, the NAND controller 17 does not execute the read operation for the storage area of this logical block ID (#0). Furthermore, if the flag information (1) is set to the erase history 32 of the corresponding logical block ID (#0), the NAND controller 17 does not execute the read operation for the storage area of this logical block ID (#0), because the data is not stored therein.

The command scheduler 19, using the write unit 24, sets the flag information (1) to the read history 31 of the corresponding logical block ID (#0) in the access history management table 21, at the time of execution of the BG read process. The write unit 24 generates write data (1) using an access command interpretation result (e.g., read operation) via the access command interpreting unit 29. That is, as shown in FIG. 4, the read history 31 of the logical block ID (#0) in the access history management table 21 is updated from the flag information (0) to the flag information (1) (see 41A in FIG. 4).

Herein, the command scheduler 19 sets the flag information (1) to the read history 31 of the corresponding logical block ID (for example, #2) even when the read operation is executed due to causes other than the access involved in this BG read process, for example, due to host access. That is, as shown in FIG. 4, the read history 31 of the logical block ID (#2) in the access history management table 21 is updated from the flag information (0) to the flag information (1) (see 41B in FIG. 4).

The command scheduler 19 sets the flag information (1) to the erase history 32 of the corresponding logical block ID (for example, #2) when the erase operation is executed due to causes other than the access involved in the BG read process. That is, as shown in FIG. 5, the erase history 32 of the logical block ID (#2) in the access history management table 21 is updated from the flag information (0) to the flag information (1) (see 50 in FIG. 5).

Referring back to FIG. 9, the command scheduler 19 clears (i.e., sets to zero) all fields of the read history 31 in the access history management table 21 at once when the read operation is completed within a time limit on the respective storage areas of the logical block IDs (#0-#5), which are in the access-target range (YES in step S3). Regarding the erase history 32, when the NAND controller 17 executes a data write operation to the NAND-type flash memory 12, the command scheduler 19 clears (i.e., sets to zero) a corresponding field of the erase history 32 of the logical block ID subjected to this data write operation.

FIG. 8 illustrates an operation status of accesses. Herein, each of the periods 84 and 85 to be described later corresponds to a time range indicative of a time elapse ratio (0%, 50%, 100%) to a time limit of the BG read process. That is, in the period 84, the time (83) when the read operation is completed indicates the time elapse ratio of 50% or less to the time limit. Furthermore, in the period 85, the time (83) when the read operation is completed indicates the time elapse ratio of almost 100% to the time limit.

As shown in FIG. 8, during the period 84 in which no host access is made after the power is turned on, the SSD controller 10 preferentially executes the BG read process 82 (see S1 and S2 in FIG. 9). That is, the NAND controller 17 executes an access command involving the BG read process, as a command with the highest priority, based on a priority from the priority notifying unit 28.

The command scheduler 19 continues the BG read process 82 until the time (83) when the read operation to the logical block IDs (#0-#5) as the access-target range is completed within the time limit. The highest priority from the priority notifying unit 28, which is given to the access command involving the BG read process, is cleared at the time (83) when the execution of this access command is completed.

Herein, the access frequency manager 22 of the command scheduler 19 manages a progress status of access for the BG read process, by using the progress managing unit 25. That is, the progress managing unit 25 manages an access progress using the access history management table 21, and an elapse of time using the timer 26.

The access frequency manager 22 inputs, as input information, the access-target range information (e.g., two chips (chip #0, chip #1)), three blocks (e.g., Block #0-Block #2), time information indicative of a time limit for a BG read process, a latest pointer of the access history management table 21, and an elapsed time for the BG read process.

Specifically, as shown in FIG. 7, the progress managing unit 25 can recognize an access progress for the BG read, based on the latest pointer 70 at the time of reading information from the access history management table 21. In addition, based on information read from the access history management table 21, the progress managing unit 25 can recognize that access is in progress when one of the read history 31 and the erase history 32 is one. The progress managing unit 25 can calculate a progress ratio using the following calculation: "progress ratio=pointer value/range of an access target (i.e., the number of blocks [3] the number of chips [2])×100". For example, a progress managing unit 25 calculates the progress ratio of "50%" if the pointer value is three and the access-target range is six.

On the other hand, the progress managing unit 25 can calculate a time elapse ratio using the following calculation: "elapse ratio=elapsed time of BG read process/time limit× 100". For example, when the progress managing unit 25 determines, using the timer 26, an elapsed time (e.g., 36 seconds) from the start of access, it thereby calculates an elapse ratio of "20%" if the time limit is "3 minutes".

Referring back to FIG. 9, the SSD controller 10 executes a host command process (S4) in the case of executing host access in accordance with a command from the host 2 (YES in S1). That is, as shown in FIG. 8, this is the case that the period 85 in which host access 81 is to be executed, appears during execution of the BG read process 82.

The SSD controller 10 preferentially executes the host access 81 in accordance with the command from the host 2 even at the time of executing the BG read process 82 (see S1 and S2 in FIG. 9). That is, the NAND controller 17 executes the command 180 indicating host data access dispatched by the command dispatcher 18, as a command with the highest priority. In this manner, the NAND controller 17 executes the data read process and write process to a logical block in the NAND-type flash memory 12, designated by the host command 180. At this time, the highest priority from the priority notifying unit 28 is already cleared as a result of the execution of a command for the BG read process 82.

Herein, the access frequency manager 22 of the command scheduler 19 manages a progress status of access for the BG read process, using the progress managing unit 25 (S5). That is, as described above, the progress managing unit 25 monitors an access progress for the BG read process using the access history management table 21, and also monitors an elapse of time within a time limit based on an elapsed time from the start of this access.

If a progress status of access and an elapse of time indicate that the BG process is delayed, especially when there is little time remaining until the end of the time limit (NO in S6), the progress managing unit 25 outputs a progress result indicative of this fact to the priority notifying unit 28.

Based on the progress result from the progress managing unit 25, the priority notifying unit 28 notifies the command arbiter 170 of the NAND controller 17 of the highest priority, as a priority of an access command involving the BG read process. In this manner, the NAND controller 17 interrupts the host access 81, and preferentially executes an access command involving the BG read process generated by the access command generating unit 27 of the access frequency manager 22 (S7). As a matter of course, if the progress status indicates that there is sufficient time remaining until the end of the time limit (YES in S6), the SSD controller 10 continues the host access 81 (S4).

As shown in FIG. 8, during the period 85 in which the host access 81 is to be executed, the SSD controller 10 interrupts the host access 81 (access block 80) and preferentially executes the BG read process 82, depending on a progress status of the BG read process 82.

Referring back to FIG. 9, the SSD controller 10 repeatedly changes (switches) execution priorities of the host access 81 and the BG read process 82 based on a progress status according to the progress managing unit 25 until the time (83) when the BG read process 82 is completed (S8).

As described in the above embodiment, based on the progress status, it is possible to manage (or, monitor) a progress status of the BG read process to be executed within a time limit and to change execution priorities of access for the BG read and host access. Accordingly, each access can be executed in a balanced manner.

Therefore, if a progress status of the BG read process indicates that sufficient time is remaining, host access can be preferentially executed, so that a latency to host access is not deteriorated excessively. Furthermore, if a progress status of the BG read process indicates little time remaining, the BG read process is preferentially executed, so that the BG read process can be completed within a time limit. Accordingly, when the present embodiment is applied to a three-dimensional NAND-type flash memory, for example, it can complete a read process within a time limit, thereby being able to prevent a situation where a memory cell loses data over time.

Furthermore, according to the present embodiment, the access history (read history 31 and erase history 32) of the BG read process can be surely recognized by referring to a progress status of the BG read process using the access history management table 21. This eliminates an excessive BG read process, so that a BG read process can be executed efficiently. That is, because of the reduction in the total amount of the BG read process to be executed, the possibility of deteriorating the latency to a host access can be reduced.

That is, the BG read process is unnecessary for a storage area in which a read process by an access such as a host access, other than access by the BG read process, has been executed, or for a storage area in which no data is stored due to data erase. In the BG read process according to the present embodiment, data is only read from a storage area that stores valid data. That is, a storage area having data erased or an unwritten storage area is excluded from an access target for the BG read process.

Herein, if host access is made to an access target to which execution of the BG read process is scheduled, the command scheduler 19 according to the present embodiment may determine that the BG process to this access target is completed. That is, since a read process by host access produces a similar effect (i.e., preventing a situation where a memory cell loses data over time) to that of the BG read process, the BG read process can be canceled. Similarly, for an access subject for a read process such as the patrol process, the BG read process may be omitted.

In addition, unlike other forms of access such as the host access, access by the patrol process, access by the refresh process, access by the compaction process, the BG read process according to the present embodiment only requires applying voltage to a memory cell. Thus, the time required for the read process can be shortened by setting a specific read command for execution of the BG read process. The BG read process thus can be executed at high speed. As a result, the possibility of deteriorating the latency to a host access can be reduced.

Examples of such a read command include a read command having a function of making read access to a word line WL without outputting data from the NAND-type flash memory 12 to the SSD controller 10, and a function of suspending the read command. Another example includes a read command having a function of controlling all chip enable (CE) signals at the same time.

Note that, access other than access for the BG read process according to the present embodiment may include, besides host access, access for the patrol process, access for the refresh process, access for the compaction process. Herein, a read process involved in the patrol process, the refresh process, the compaction process, etc., is executed spontaneously by the SSD 1 based on a command unrelated to a command from the host 2.

On the other hand, the BG read process according to the present embodiment is executed spontaneously by the SSD 1 based on a command unrelated to a command from the host 2. However, as described above, the BG read process according to the present embodiment differs from a read process involved in any of the patrol process, the refresh process, the compaction process, etc. Specifically, for example, the patrol process includes a process to execute verification and error correction of stored data using the ECC circuit 13A under control of the processor 13, with the use of data read by the read process. Data read by the read process is used for other processes such as the refresh process and the compaction process. On the other hand, the BG read process according to the present embodiment aims to improve data retention, and thus may not use read data, as described above.

[Modification]

Figure 11:
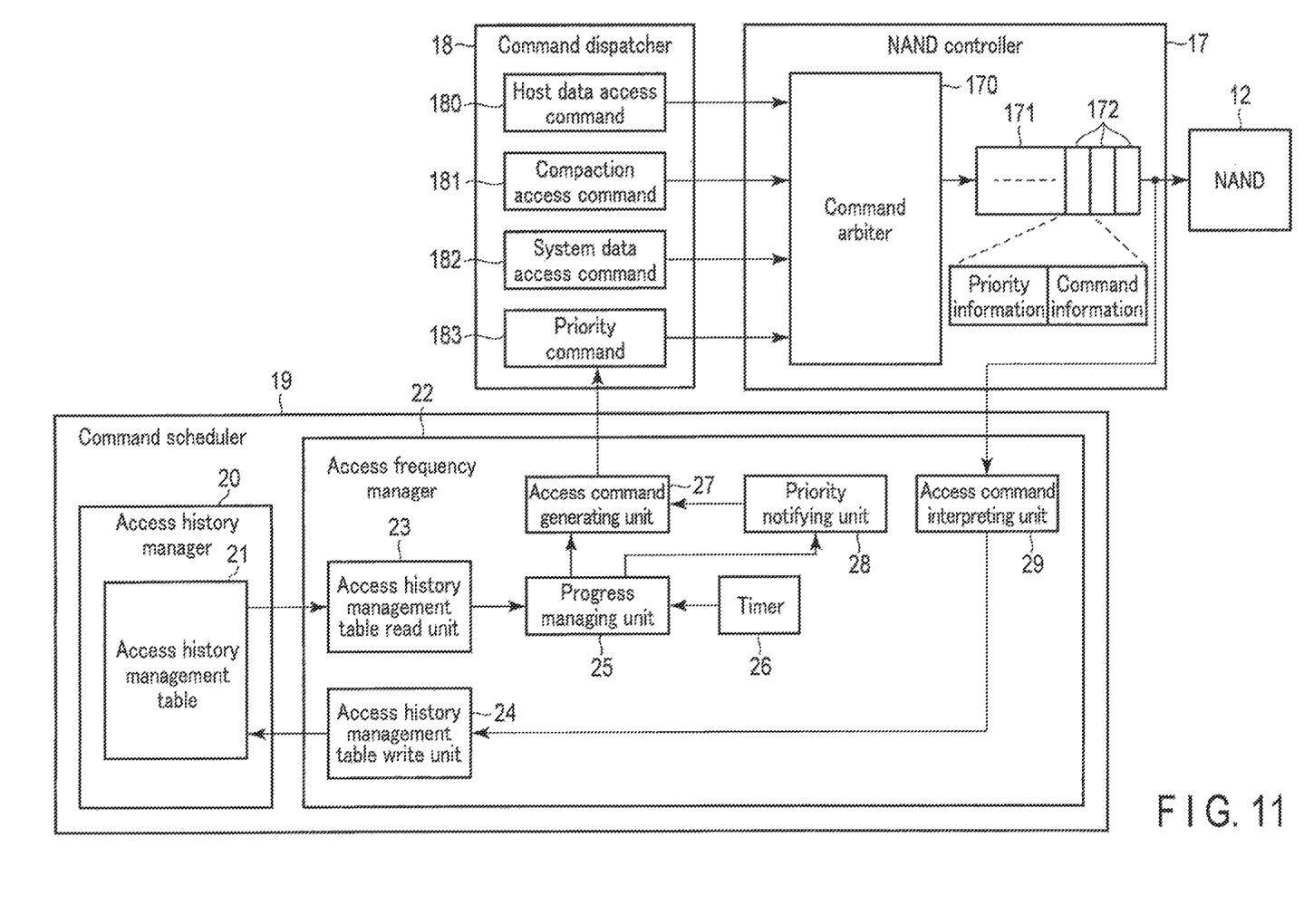
FIG. 11 is a block diagram illustrating the configurations of a command scheduler and peripheral circuits according to a modification.

FIG. 11 is a block diagram illustrating the configurations of the command scheduler 19 and the peripheral circuits. Hereinafter, the configuration of the modification will be described. The same structures as those in the embodiment described above, shown in FIG. 2, will be labeled with the same reference numerals, and will be omitted from explanations thereof.

According to the present modification, in the command scheduler 19, the access command generating unit 27 generates an access command including a priority output by the priority notifying unit 28, in the case of generating an access command involving a BG read process based on a progress result managed by the progress managing unit 25.

The command dispatcher 18 holds an access command from the access command generating unit 27, as a priority command 183, and dispatches the command 183 to the NAND controller 17. The command dispatcher 18 assigns the NAND controller 17 with a command 180 indicating host data access, a command 181 indicating compaction access, and a command 182 indicating system data access.

The NAND controller 17 includes a command arbiter 170 and a command queue 171, and stores a command 172, a priority of which is arbitrated by the command arbiter 170, into the command queue 171. Each command 172 stored in the command queue 171 includes priority information along with command information.

The command arbiter 170 executes a command arbitration process by, for example, a round robin method, and arbitrates commands by treating a priority command 183 as a command with the highest priority. In a similar manner, the command arbiter 170 arbitrates commands by treating the host data access command 180, the compaction access command 181, and the system data access command 182, as a command with the second highest priority, a command with the third highest priority, and a command with the fourth highest priority, respectively.

The NAND controller 17 searches the command queue 171 at the time of execution of commands, and issues commands in the order of priority according to priority information.

The access command interpreting unit 29 interprets a command output from the command queue 171, and acquires information of a read process, a write process and an erase process, which are executed along with access to the NAND-type flash memory 12, based on the interpretation of the command.

With the configuration of the modification described above, when executing a command, the NAND controller 17 executes an access command involving the BG read process, with a priority (for example, the highest priority) being set based on priority information. This eliminates the necessity of a process for clearing the highest priority at the time of completion of the execution of this access command.

This modification can allow a similar effect to that of the embodiment described above. That is, each access can be executed in a balanced manner by changing execution priorities of access by the BG read and host access. Therefore, host access is preferentially executed based on a progress status of the BG read process, so that a latency to a host access is not deteriorated excessively. Furthermore, the BG read process can be completed within a time limit by preferentially executing the BG read process. Additionally, the BG read process can be performed with speed and efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory; and
   a controller circuit electrically connected to the nonvolatile memory and configured to:
   execute a first process that manages a history of accesses to a first storage area of the nonvolatile memory, the accesses including at least a host read access and a background read access, the host read access being an access in which data read from the nonvolatile memory is sent to a host via the controller circuit, the background read access being an access in which data read from the nonvolatile memory is not sent to the controller circuit, and
   execute a second process that manages a progress of accesses to all storage regions in the first storage area so that said all storage regions in the first storage area are accessed within a first time limit, based on the history of accesses, wherein the controller circuit is configured to, in the second process,
   determine a progress rate of the accesses to said all storage regions within the first time limit on the basis of the number of storage regions that have been accessed since data was last written therein,
   in a case where the progress rate is higher than a threshold value, execute the host read access with a higher priority than the background read access, and
   in a case where the progress rate is lower than the threshold value, execute the background read access with a higher priority than the host read access, so as to interrupt an executing host read access to execute the background read access.

2. The memory system of claim 1, wherein the controller circuit is configured to:
   update the history of the accesses in association with addresses respectively corresponding to storage regions in the first storage area, as the first process; and
   execute a read process on at least one storage region in the first storage area, based on the progress of the accesses.

3. The memory system of claim 2, wherein:
   the history of the accesses includes, for each storage region in the first storage area, read history information indicative of completion of a read process, and erase history information indicative of completion of an erase process, the read process including at least the host read access and the background read access; and
   the controller circuit is configured to update the read history information at a time of execution of the read process, and update the erase history information at a time of execution of the erase process.

4. The memory system of claim 3, wherein the controller circuit is configured to:
   execute the read process to a storage region for which the history of the accesses indicates that no read process has been executed since the erase operation was executed to the storage region; and
   execute no read process to a storage region for which the history of the accesses indicates that the read process has been executed since the erase operation was executed to the storage region.

5. The memory system of claim 3, wherein the controller circuit is further configured to clear the read history information of a storage region as the first process, at a time of completion of the read process to the storage region.

6. The memory system of claim 2, wherein the controller circuit is configured to:
   execute, as the read process, at least one of a first read process and a second read process different from the first read process; and
   update the history of the accesses at a time of execution of the first read process or the second read process.

7. The memory system of claim 6, wherein the controller circuit is configured to execute a specific read process that prevents deterioration in data retention of said at least one storage region in the first storage area, as the first read process.

8. The memory system of claim 1, wherein the controller circuit is configured to manage the progress of the accesses including a progress of a read process to all storage regions in the first storage area and an elapse of time until completion of the read process to all storage regions in the first storage area, as the second process.

9. The memory system of claim 8, wherein the controller circuit is further configured to set a higher priority of the read process than a priority of another process to each storage regions in the first storage area based on the elapse of time to complete the read process to all storage regions in the first storage area within the first time limit.

10. The memory system of claim 1, wherein the controller circuit is further configured to omit a read process to one storage region in the first storage area to which a read process is already executed or to one storage region in the first storage area from which data has been erased, at a time of sequentially executing read processes to all storage regions in the first storage area.

11. A method of controlling a nonvolatile memory of a memory system by a controller circuit, said method comprising:
   executing a first process that manages a history of accesses to a first storage area of the nonvolatile memory, the accesses including at least a host read access and a background read access, the host read access being an access in which data read from the nonvolatile memory is sent to a host via the controller circuit, the background read access being an access in which data read from the nonvolatile memory is not sent to the controller circuit, and
   executing a second process that manages a progress of accesses to all storage regions in the first storage area so that said all storage areas in the first storage area are accessed within a first time limit, based on the history of the accesses, wherein the second process includes,
   determining a progress rate of the accesses to said all storage regions within the first time limit on the basis of the number of storage regions that have been accessed since data was last written therein,
   in a case where the progress rate is higher than a threshold value, executing the host read access with a higher priority than the background read access, and in a case where the progress rate is lower than the threshold value, executing the background read access with a higher priority than the host read access, so as to interrupt an executing host read access to execute the background read access.

12. The method of claim 11, wherein the first process comprises:
   updating the history of the accesses in association with addresses respectively corresponding to storage regions in the first storage area; and
   executing a read process on at least one storage region in the first storage area, based on the progress of the accesses.

13. The method of claim 12, wherein:
   the history of the accesses comprises, for each storage region in the first storage area, read history information indicative of completion of a read process, and erase history information indicative of completion of an erase process, the read process including at least the host read access and the back-ground read access; and
   the first process comprises updating the read history information at a time of execution of the read process, and updating the erase history information at a time of execution of the erase process.

14. The method of claim 13, wherein:
   the read process comprises:
   executing the read process to a storage region for which the history of the accesses indicates that no read process has been executed since the erase operation was executed to the storage region; and
   executing no read process to a storage region for which the history of the accesses indicates that the read process has been executed since the erase operation was executed to the storage region.

15. The method of claim 13, wherein the first process clears the read history information of a storage region as the first process, at a time of completion of the read process to the storage region.

16. The method of claim 12, wherein:
   the read process comprises at least one of a first read process and a second read process different from the first read process; and
   the first process comprises updating the history of the accesses at a time of execution of the first read process or the second read process.

17. The method of claim 16, wherein the first read process comprises executing a specific read process that prevents deterioration in data retention in said at least one storage region in the first storage area.

18. The method of claim 11, wherein the second process comprises managing the progress of the accesses including a progress of a read process to all storage regions in the first storage area and an elapse of time until completion of the read process to all storage regions in the first storage area.

19. The method of claim 18, wherein the second process comprises setting a higher priority of the read process than a priority of another process to each storage region in the first storage area based on the elapse of time to complete the read process to all storage regions in the first storage area within the first time limit.

20. The method of claim 11, further comprising omitting a read process to one storage region in the first storage area to which a read process is already executed or to one storage region in the first storage area from which data has been erased, at a time of sequentially executing read processes to all storage regions in the first storage area.

* * * * *